United States Patent [19]
Berstis

[11] Patent Number: 5,978,819
[45] Date of Patent: Nov. 2, 1999

[54] AUTOMATICALLY CONVERTING PREFORMATTED TEXT INTO REFLOWABLE TEXT FOR TV VIEWING

[75] Inventor: Viktors Berstis, Austin, Tex.

[73] Assignee: International Business Machines Corporation, Armonk, N.Y.

[21] Appl. No.: 08/909,598

[22] Filed: Aug. 12, 1997

[51] Int. Cl.⁶ .................................................. G06F 17/60
[52] U.S. Cl. ........................................................ 707/513
[58] Field of Search ................................... 707/513, 522, 707/518, 531, 523, 509, 500; 348/17, 23, 113, 109

[56] References Cited

U.S. PATENT DOCUMENTS

| | | | |
|---|---|---|---|
| 4,723,209 | 2/1988 | Hernandez et al. | 364/300 |
| 4,829,470 | 5/1989 | Wang | 364/900 |
| 4,899,292 | 2/1990 | Montagna et al. | 364/521 |
| 4,928,252 | 5/1990 | Bagge et al. | 364/519 |
| 5,457,776 | 10/1995 | Wong et al. | 395/147 |
| 5,530,942 | 6/1996 | Tzou et al. | 395/147 |
| 5,701,451 | 12/1997 | Rogers et al. | 395/600 |
| 5,787,254 | 7/1998 | Maddalozzo, Jr. et al. | 395/200.58 |
| 5,845,303 | 12/1998 | Templeman | 707/517 |

*Primary Examiner*—Joseph H. Feild
*Assistant Examiner*—Alford W. Kindred
*Attorney, Agent, or Firm*—Jeffrey S. LaBaw; Daniel E. Venglarik; Andrew J. Dillon

[57] ABSTRACT

Preformatted text within HTML documents is examined to determine if reflowing the text during formatting for display within a narrow viewing area is appropriate. This determination is based on various special formatting indicia which indicate that the text is a table or other informational device in which lines of text should not be reflowed. If no special formatting indicia are detected, the preformatted text tags are removed, allowing the preformatted text to be reflowed when formatted for display. Otherwise, the preformatted text is left alone or revised according to a user preference. Preformatted text, when appropriately reflowed, is thus rendered more readable and the necessity for scrolling right and left is eliminated.

16 Claims, 6 Drawing Sheets

AUTOMATICALLY CONVERTING PREFORMATTED TEXT INTO REFLOWABLE TEXT FOR TV VIEWING

BACKGROUND OF THE INVENTION

1. Technical Field

The present invention relates in general to displaying HTML data on data processing system display devices and in particular to displaying HTML data on a television connected to a set-top box data processing system. Still more particularly, the present invention relates to selectively converting preformatted HTML text into reflowable text for display on a television connected to a set-top box data processing system.

2. Description of the Related Art

Many contemporary data processing system applications employ a standard page description language, the Hypertext Markup Language (HTML), for data transfers to other data processing systems or applications. HTML data comprises standard ASCII text documents in which there are embedded "tags," text enclosed within brackets (<>). Normally, tags are utilized in pairs within the document, with a slash (/) within the second tag signifying the end of the desired formatting. For example, text contained between the tags "<B>" and "</B>" will be displayed in a boldfaced font by an HTML-compatible application.

HTML documents may be viewed as simple text documents, in which case the tags are visible, or using an HTML-compatible application, which will not display the tags. HTML-compatible applications recognize tags as structure or formatting commands, references to other elements such as graphical, motion video, or audio data, or links to other HTML documents. Thus, an HTML-compatible application will not display the tags, but will utilize the tags to format the display of other text within the HTML document.

Most of the time, any extra "white space" from spaces, tabs, or hard returns in an HTML document is stripped out by any HTML-compatible application displaying the document, such as a World Wide Web (WWW or "Web") browser. For example, multiple sequential spaces within an HTML document are collapsed and displayed as a single space by Web browsers. An exception to this elimination of extra white space results from the preformatted text tag <PRE>. Any extra white space within text surrounded by the tags <PRE> and </PRE> is retained in the final output. This allows text within an HTML document to be presented in the same formatting, with all original white space, when viewed with an HTML-compatible application as when viewed using a simple text editor.

The preformatted text tag may be utilized to indent or format lines, and thus may be employed for things such as code examples. Furthermore, text may be aligned by padding it with white spaces, such that preformatted text may be utilized to create tables in the final display. Such use of the preformatted text tag was common with HTML documents created for early versions of HTML, which did not support tables. Often, however, low-end document editors utilize the preformatted text tag for all HTML documents created with that editor. Preformatted text tags are also often used to quickly and easily convert files which were originally in some sort of text-only form to HTML documents.

For set-top box systems, preformatted text may have an undesirable effect on display of HTML documents. Television screens, the display device for set-top box systems are typically designed, are usually narrower than the 80 character computer screens utilized with conventional data processing systems. Preformatted text within HTML documents does not "reflow," or naturally break lines of text into the maximum line length which may be displayed for a given display device. Because preformatted text is not reflowed to fit specific display devices, lines of text often will not fit a television screen. The user must therefore scroll the display to the right to view the end of a line of text, then scroll back to the left to view the beginning of the next line. This renders the user interface extremely annoying, and generally impedes a user's ability to read the HTML document.

HTML documents are one specific example of a class of information media which may generally be referred to a "compound" documents. Compound documents include text and other features, such as graphics, tables or spreadsheets. Furthermore, other markup languages are widely used, such as GML and SGML. Such other markup languages may have differently preformatted text tags or employ different approaches to precluding reflow of selected text blocks.

It would be desirable, therefore, to intelligently reflow text within compound document to fit a display screen or window while leaving special features such as graphics or tables within the document undisturbed. As a specific example, it would be desirable to improve the readability of HTML documents incorporating preformatted text tags, eliminating any unnecessary need to scroll the display of a user interface to the right and left for each line of text in the display. It would also be desirable to reflow preformatted text within an HTML document where the nature of the text renders such alteration appropriate.

SUMMARY OF THE INVENTION

It is therefore one object of the present invention to provide a method for selectively reflowing text within a compound document to fit a display area while leaving specially formatted features of the document undisturbed.

It is another object of the present invention to provide an improved method for displaying HTML data on data processing system display devices.

It is another object of the present invention to provide an improved method for displaying HTML data on a television connected to a set-top box data processing system.

It is yet another object of the present invention to provide a method and apparatus for selectively converting preformatted HTML text into reflowable text for display on a television connected to a set-top box data processing system.

The foregoing objects are achieved as is now described. Preformatted text within HTML documents is examined to determine if reflowing the text during formatting for display within a narrow viewing area is appropriate. This determination is based on various special formatting indicia which indicate that the text is a table or other informational device in which lines of text should not be reflowed. If no special formatting indicia are detected, the preformatted text tags are removed, allowing the preformatted text to be reflowed when formatted for display. Otherwise, the preformatted text is left alone or revised according to a user preference. Preformatted text, when appropriately reflowed, is thus rendered more readable and the necessity for scrolling right and left is eliminated.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
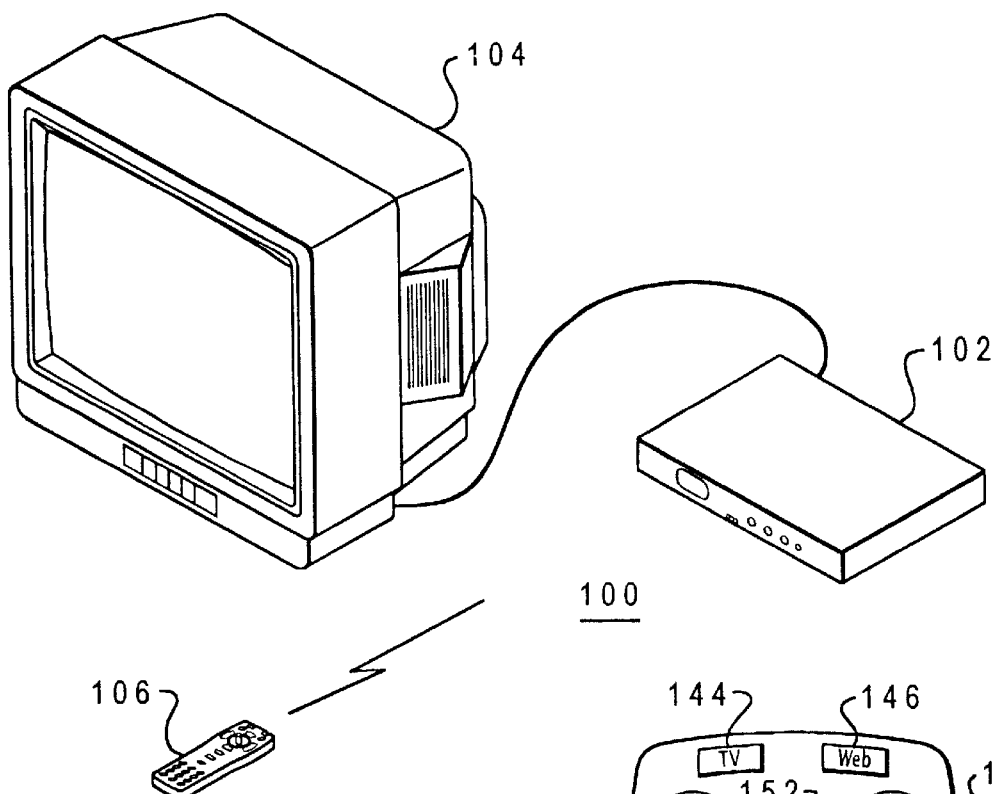
FIGS. 1A–1D depict various pictorial representations of a data processing system in which a preferred embodiment of the present invention may be implemented.

With reference now to the figures, and in particular with reference to FIGS. 1A through 1D, various pictorial representations of a data processing system in which a preferred embodiment of the present invention may be implemented are depicted. FIG. 1A is a pictorial representation of the data processing system as a whole. Data processing system 100 in the depicted example is a set-top box providing, with minimal economic costs for hardware to the user, access to the Internet. Data processing system 100 includes a data processing unit 102, which is preferably sized to fit in typical entertainment centers and provides all required functionality conventionally found in personal computers to enable a user to "browse" the Internet. Additionally, data processing unit 102 may provide other common functions such as, for example, serving as an answering machine, transmitting or receiving facsimile transmissions, or providing voice mail facilities.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device in conventional personal computers, including the ability to move a cursor on a display and select items.

Figure 1D:
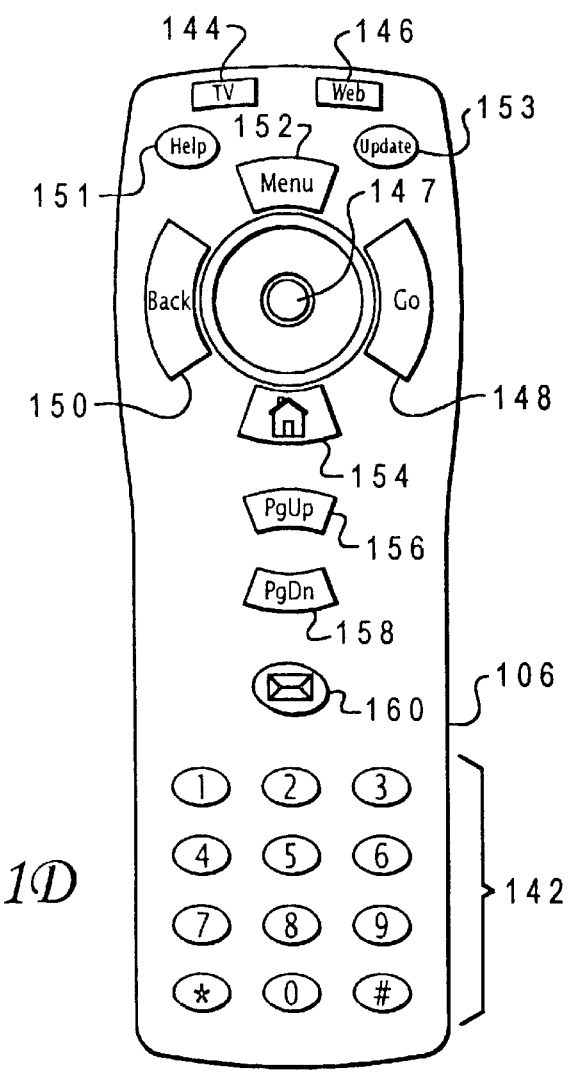
Figure 1B:
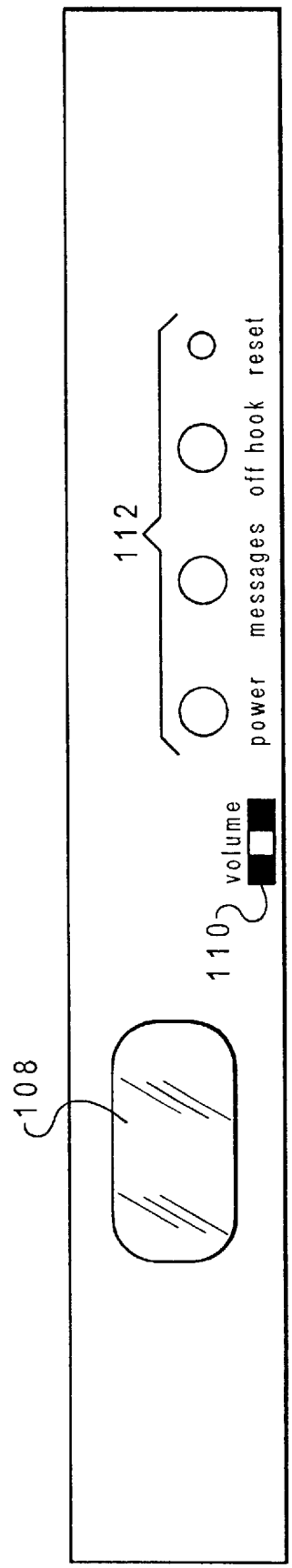

FIG. 1B is a pictorial representation of the front panel of data processing unit 102 in accordance with a preferred embodiment of the present invention. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 1C:
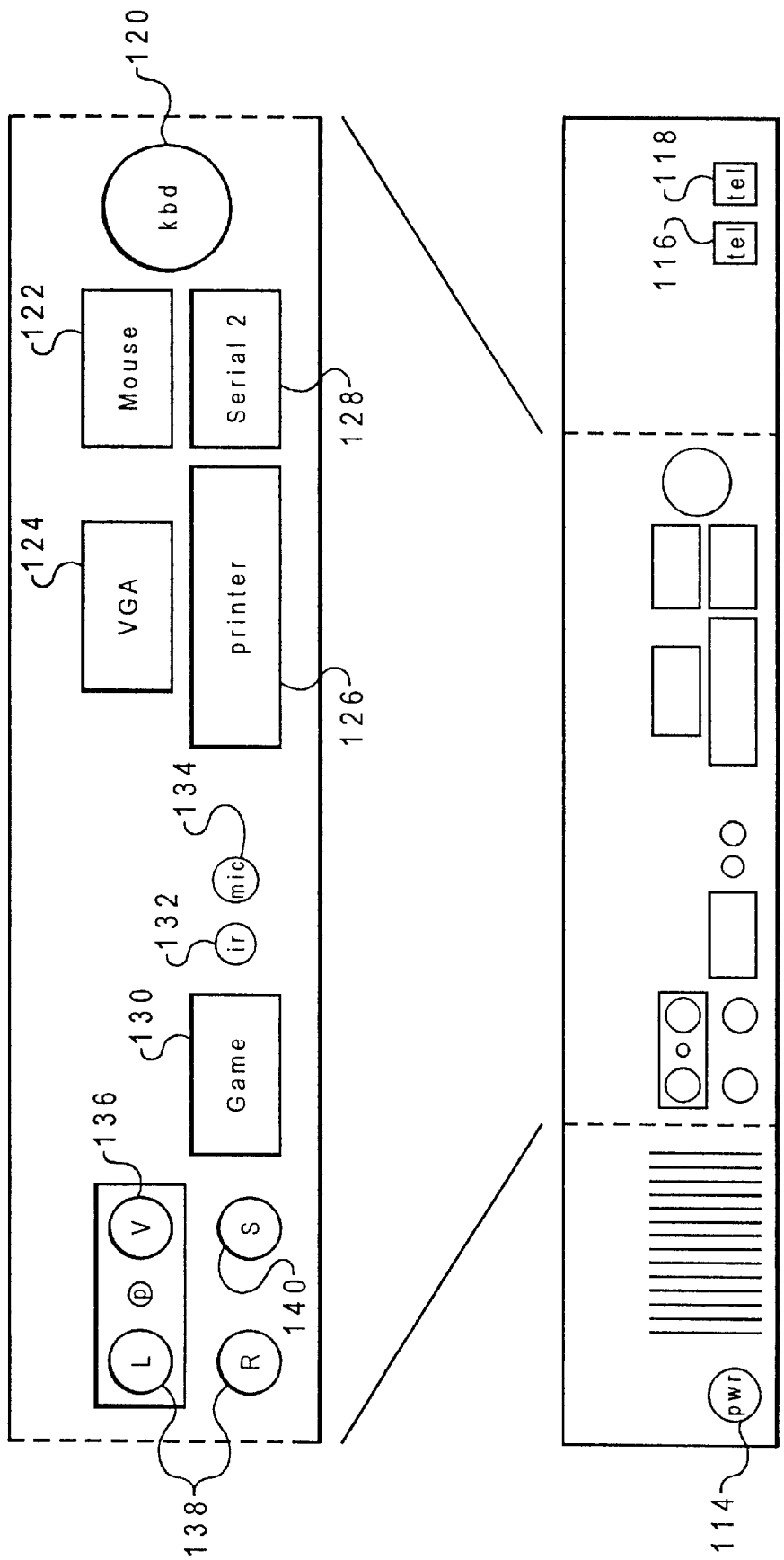

FIG. 1C is a pictorial representation of the rear panel of data processing unit 102 in accordance with a preferred embodiment of the present invention. A three wire (ground included) insulated power cord 114 passes through the rear panel. Standard telephone jacks 116 and 118 on the rear panel provide an input to a modem from the phone line and an output to a handset (not shown). The rear panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel 3/4 modulator (not shown) may be connected in-line with the antenna connection.

FIG. 1D is a pictorial representation of remote control unit 106 in accordance with a preferred embodiment of the present invention. Similar to a standard telephone keypad, remote control unit 106 includes buttons 142 for arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. A pointing device 147, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Menu" button 152 causes a contextsensitive menu of options to be displayed, while home button 154 allows to user to return to a default display of options. "PgUp" and "PgDn", buttons 156 and 158 allows the user to change the content of the display in display-sized blocks rather than by scrolling. The message button 160 allows the user to retrieve messages. In addition to, or in lieu of, remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 2:
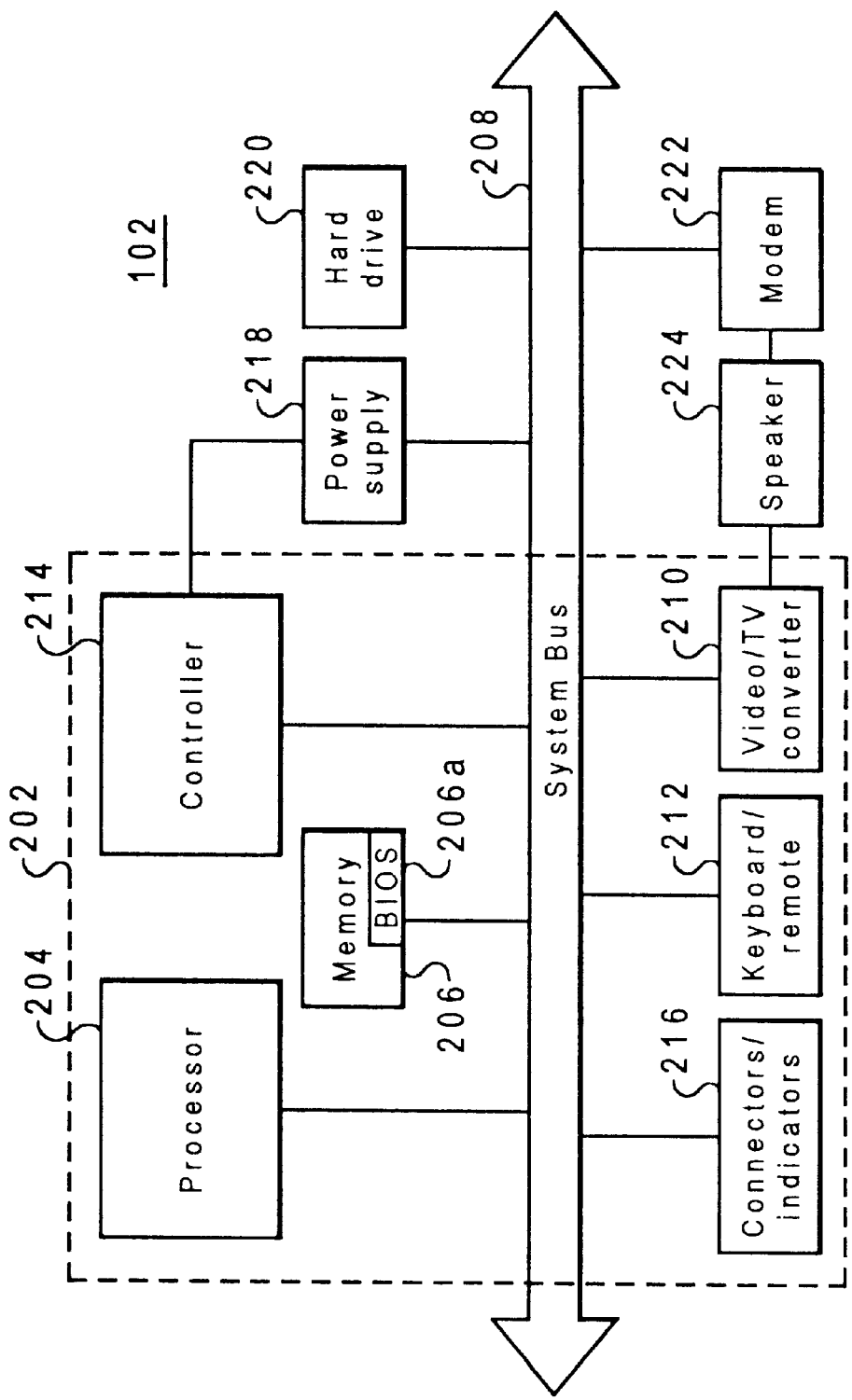
FIG. 2 is a block diagram for the major components of data processing unit in accordance with a preferred embodiment of the present invention.

Referring now to FIG. 2, a block diagram for the major components of data processing unit 102 in accordance with a preferred embodiment of the present invention is portrayed. As with conventional personal computers, data processing unit 102 includes a motherboard 202 containing a processor 204 and memory 206 connected to system bus 208. Processor 205 is preferably at least a 486 processor operating at or above 100 MHz. Memory 206 includes read only memory (ROM) 206a containing a basic input/output services (BIOS) routine and may include cache memory and/or video RAM.

Video/TV converter 210 on motherboard 202 and connected to system bus 208 generates computer video signals for computer monitors, a composite television signal, and an S-Video signal. The functionality of video/TV converter 210 may be provided utilizing commercially available video and converter chips. Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the functions provided by an infrared keyboard. Connectors/indicators 216 on motherboard 202 provide the connections and indicators on data processing unit 102 described above.

External to motherboard 202 in the depicted example are power supply 218, hard drive 220, modem 222, and speaker 224. Power supply 218 is a conventional power supply except that it receives a control signal from controller 214 which effects shut down of all power to motherboard 202, hard drive 220, and modem 222. In some recovery situations, removing power and rebooting is the only guaranteed method of resetting all of these devices to a known state. Thus power supply 218, in response to a signal from controller 214, is capable of powering down and restarting data processing unit 102.

Hard drive 220 contains operating system and applications software for data processing unit 102, which preferably includes: IBM DOS 7.0, a product of International Business Machines Corporation in Armonk, N.Y.; Windows 3.1, a product Microsoft Corporation in Redmond, Wash.; and Netscape Navigator, a product of Netscape Communications Corporation in Mountain View, Calif. Data may also be stored on hard drive 220. Modem 222, inserted into a slot mounted sideways on motherboard 202, is preferably a 33.6 kbps modem supporting the V.42bis, V34bis, V.34, V.17 Fax, MNP 1–5, and AT command sets.

Controller 214 is preferably one or more of the 805x family controllers. Controller 214 is continuously powered and, when data processing unit 102 is turned on, monitors the system for a periodic "ping" indicating that data processing unit 102 is operating normally. In the event that controller 214 does not receive a ping within a prescribed timeout period, controller 214 removes power from the system and restarts the system. This may be necessary, for example, when the system experiences a general protection fault. If multiple attempts to restart the system prove unsuccessful, controller 214 shuts off data processing unit 102 and signals that service is required through indicators 216. Thus, data processing unit 102 is capable of self-recovery in some circumstances without involvement by a user.

Controller 214 also receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use and specifies the boot sector selection during any power off-on cycle.

Those skilled in the art will recognize that the components depicted in FIGS. 1A–1D and 2 and described above may be varied for specific applications or embodiments. Such variations in which the present invention may be implemented are considered to be within the spirit and scope of the present invention.

Figure 3A:
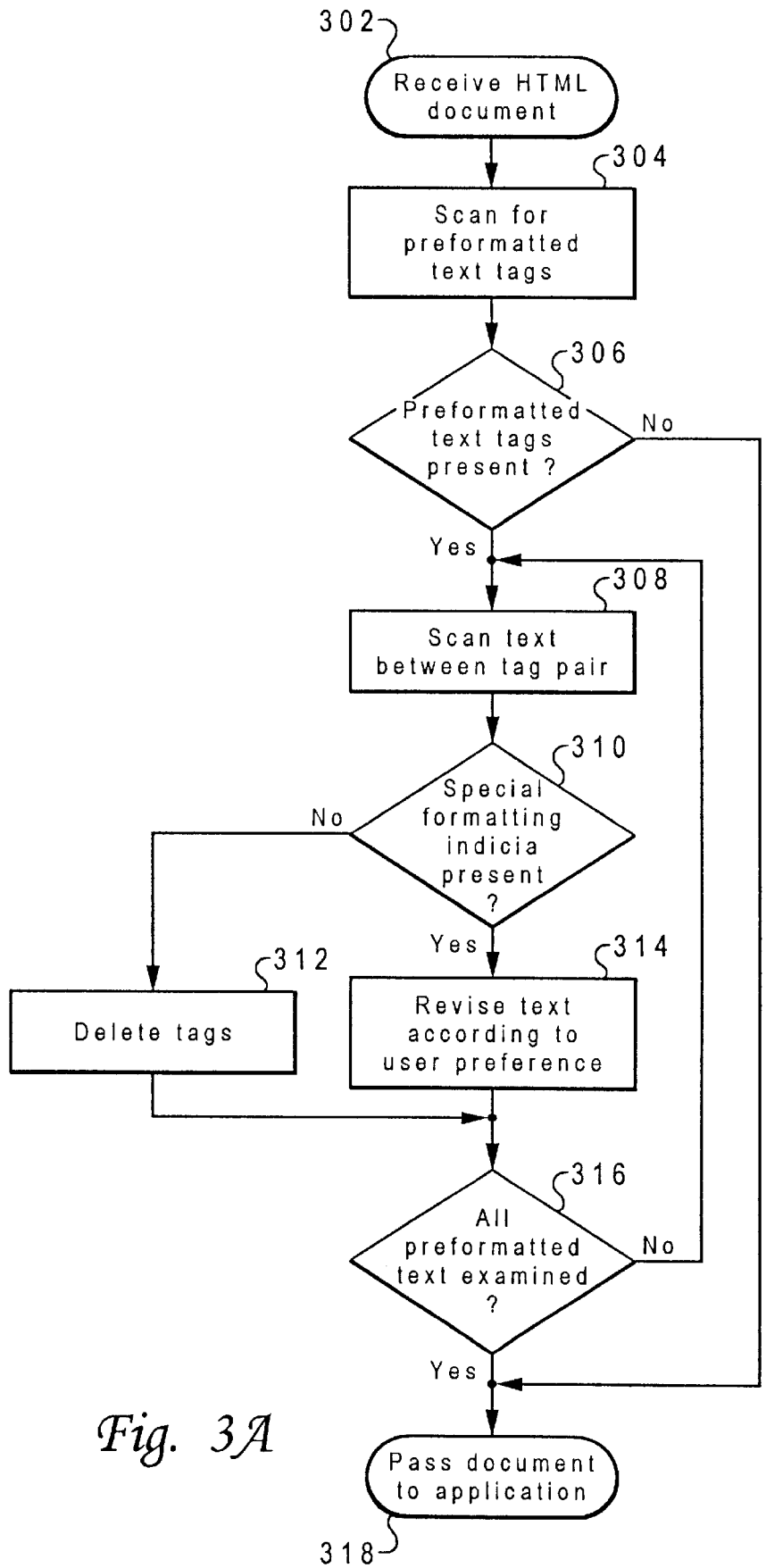
FIGS. 3A–3B depict a high level flowchart for a process for automatically converting preformatted text within an HTML document for display by a data processing system in accordance with a preferred embodiment of the present invention.
Figure 3B:
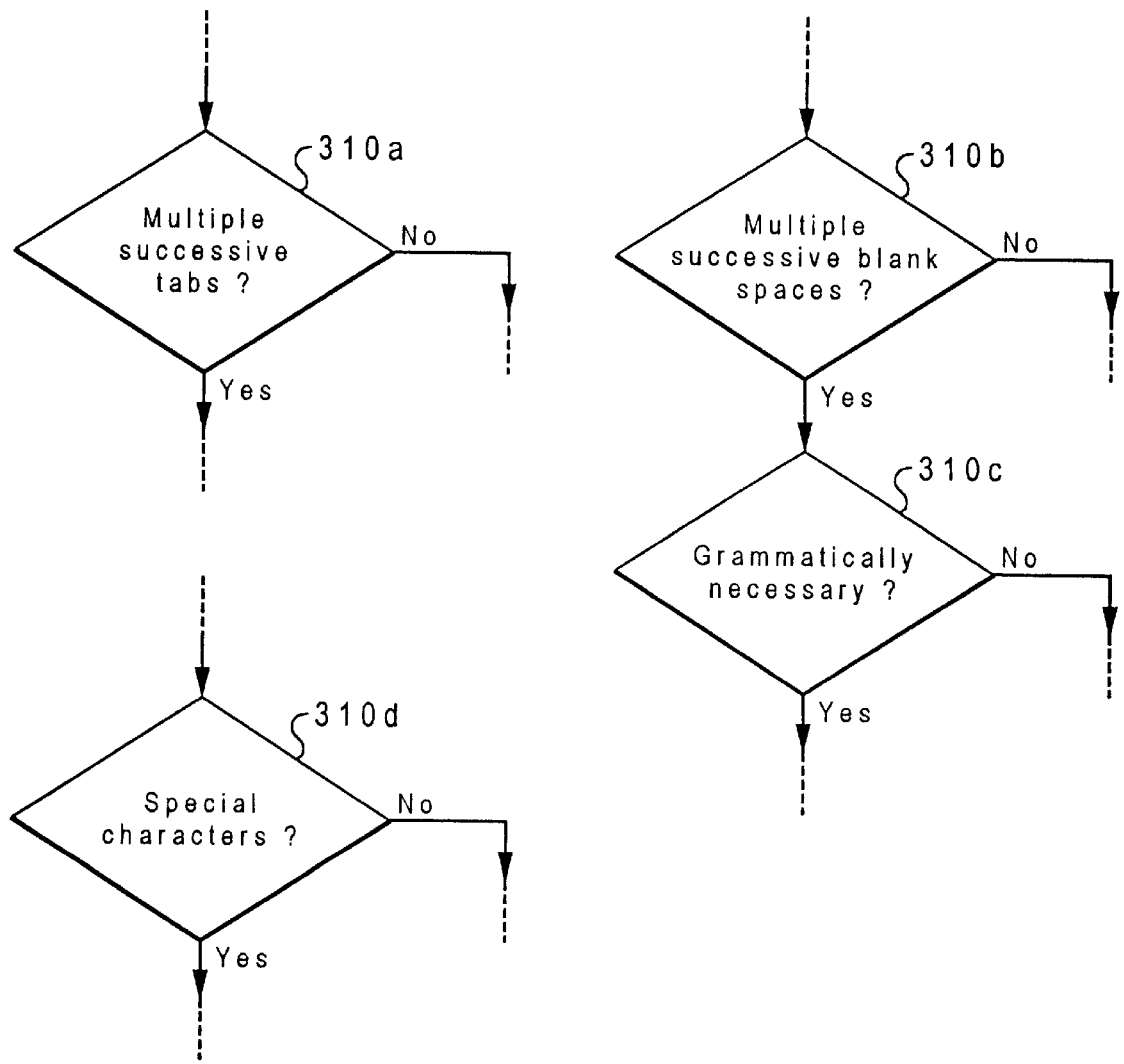

With reference now to FIGS. 3A and 3B, a high level flowchart for a process for automatically converting preformatted text within an HTML document for display by a data processing system in accordance with a preferred embodiment of the present invention is depicted. The process may be utilized to automatically convert preformatted text within HTML documents before the document is passed to an application, such as by eliminating unnecessary preformatted text tags before the document is formatted by a Web browser for display.

The exemplary embodiment of the process begins at step 302, which depicts receiving an HTML document. The HTML document received may be stored in a memory. The process then passes to step 304, which illustrates scanning the HTML document to determine whether preformatted text tags (<PRE> and/or </PRE>) are present within the body of the document. The process next passes to step 306, which depicts a determination of whether preformatted text tags were found within the HTML document received. If not, the process proceeds to step 318, which depicts passing the HTML document to the application employed to format the document for display.

If the HTML document received contains preformatted text tags, the process proceeds instead to step 308, which illustrates scanning the text between a pair of preformatted text tags. The process next passes to step 310, which depicts a determination of whether special formatting indicia were detected within the preformatted text, which is the text between or delimited by the preformatted text tags. Special formatting indicia are indicators that the preformatted text is a table or some other informational device which should not be reflowed. Other special formatting indicia may comprise tags indicating that a portion of the document is, for example, a graphical image or a spreadsheet. Various indicia of special formatting requirements are described below in conjunction with FIG. 3B.

Referring again to step 310, if no special formatting indicia were detected in the preformatted text, the process proceeds to step 312, which illustrates deleting the preformatted text tags so that the text will be reflowed when formatted for display. If, however, special formatting indicia were detected within the preformatted text, the process proceeds instead to step 314, which depicts revising the preformatted text according to a user preference. Users may optionally be allowed to select the manner in which preformatted text is displayed. One option would make no revisions to the preformatted text, leaving the HTML document to be displayed as it was received. An alternative is to cut the line lengths within the HTML document to fit the screen line, inserting hard returns in the preformatted text where appropriate. Other alternatives may also be provided to a user for handling preformatted text which may not be appropriately reflowed, such as displaying the text in a smaller font. However, such an alternative may substantially degrade viewability of the text on a set-top box data processing system, offsetting any benefits achieved from avoiding the necessity of scrolling left and right.

Once the preformatted text tags are deleted (step 312) or the preformatted text is revised according to a current user preference (step 314), the process passes to step 316, which illustrates a determination of whether all preformatted text within the HTML document has been examined. This determination may be made, for example, by determining whether additional preformatted text tag pairs are present which delimit text which has not yet been examined.

If additional preformatted text within the HTML document remains to be examined, the process returns to step 308 to scan the text between an additional pair of preformatted text tags. If no additional preformatted text requires examination, however, the process proceeds to step 318, which illustrates passing the (possibly revised) document to the application utilized to format the document for display, as described above. During formatting of the text for display, reflowable text is divided into lines having an allowed line length (that is, a length which will fit in an allowed display width).

Referring to FIG. 3B, various special formatting indicia for determining whether preformatted text may be appropriately reflowed in accordance with a preferred embodiment of the present invention are illustrated. Determinations of whether such special formatting indicia are present, steps which may be readily incorporated into the process depicted in FIG. 3A, are illustrated. Step 310a depicts determining whether the preformatted text includes multiple successive tabs. Steps 310b and 310c depict determining whether the text includes multiple successive blank spaces which grammatically unnecessary—that is, multiple successive blank spaces which are not situated at the end of a line of text, at the beginning of a line, or following certain specific characters, such as periods, exclamation points, question marks, or colons.

Step 310d depicts a determination of whether the preformatted text includes special characters indicative of a table or other two-dimensional text device. The special characters which are utilized for this determination are typically those which are not letters, numerals, or standard punctuation (periods, commas, exclamation points, question marks, colons, semi-colons, hyphens, dashes, parentheses, and single or double quotation marks). The special characters which are the focus of the determination may include vertical bars |, multiple successive hyphens (-) or dashes (--), multiple successive underscores (_), plus signs (+), or box characters (e.g., ┌, ├, ┘, ╠, ╬, etc.). A variant of this step determines whether similar special characters appears on multiple successive lines, which is especially indicative of a table or other two-dimensional structure. For example, multiple successive lines containing vertical bars suggests that the preformatted text includes a box or table. Another variant seeks to determine whether blank spaces, periods, or the beginning or ending points of words align vertically in multiple successive lines, which is also indicative of a table.

The special formatting indicia described above are merely exemplary. Other special formatting indicia or criteria may be identified by detailed analysis of the HTML documents most likely to require automatic conversion of preformatted text for a specific application. Such other special formatting indicia are considered to fall within the scope and spirit of the present invention.

In the context of more general compound documents, other appropriate indicia of special formatting may also be identified, depending on the particular approach used to create the compound document. Tags identifying tables or graphical image data in post-script format, for example, may be found in some compound documents (including documents consistent with later versions of HTML). Other tags may indicate a stylized formatting of the text which the author or publisher wishes to be preserved, as in poetry, advertisements, or promotional materials. Such indicia may be utilized within the present invention in the manner described.

The present invention allows preformatted text tags to be stripped from an HTML document where the nature of the text is such that the text may be appropriately reflowed. Text contained within preformatted text tag pairs is examined to determine if any special formatting indicia—elements indicating that the preformatted text is a table or other two-dimensional device which should not be reflowed—are present. Where reflowing the preformatted text is appropriate, preformatted text tags may be eliminated. This allows the text to be displayed in a more readable manner and eliminates the need for users to scroll right and left for each line of text.

Although described in the context of automatically converting preformatted text for display on set-top box data processing systems, the present invention may be employed in a variety of other circumstances. For example, an application providing display windows within the overall display where users may modify the size of each display window may also benefit from the present invention.

A variety of other applications may benefit from automatically reflowing text where appropriate. For example, other markup languages may provide tags for protecting the formatting of a particular block of text. The present invention may be employed within applications compatible to such markup languages, employing the protective tags as indicia of special formatting. Alternatively, a USENET newsreader may display postings in a font which does not permit lines of text within the posting to fill or fit evenly within the display area. In such a circumstance, reflow of certain portions of the posting, such as the posting header or a signature file appended to the end, may be inappropriate. The present invention may be employed within the newsreader to selectively reflow text as appropriate.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of automatically converting preformatted text to reflowable text, comprising:

determining whether text includes preformatted text tags defining line formatting for text delimited by the preformatted text tags;

responsive to determining that the text includes preformatted text tags defining line formatting for text delimited by the preformatted text tags, determining whether text delimited by the preformatted text tags includes special formatting indicia indicating that the text delimited by the preformatted text tags should not be converted to reflowable text; and responsive to determining that the text delimited by the preformatted text tags does not include special formatting indicia, deleting the preformatted text tags, wherein the text is automatically converted from preformatted text to reflowable text.

2. The method of claim 1, wherein the step of determining whether text includes preformatted text tags further comprises:

determining whether the text includes tags selected from the group consisting of <PRE> and </PRE>.

3. The method of claim 1, wherein the step of determining whether text delimited by the preformatted text tags includes special formatting indicia further comprises:

determining whether the text delimited by the preformatted text tags includes multiple successive tabs.

4. The method of claim 1, wherein the step of determining whether text delimited by the preformatted text tags includes special formatting indicia further comprises:

determining whether the text delimited by the preformatted text tags includes multiple successive spaces.

5. The method of claim 1, wherein the step of determining whether the text delimited by the preformatted text tags includes special formatting indicia further comprises:

determining whether the text delimited by the preformatted text tags includes multiple successive spaces occurring at a location other than a location selected from the group consisting of the beginning of a line, the end of a line, and following a colon.

6. The method of claim 1, wherein the step of determining whether the text delimited by the preformatted text tags includes special formatting indicia further comprises:

determining whether text delimited by the preformatted text tags includes special characters.

7. The method of claim 1, further comprising:

responsive to determining that the text delimited by the preformatted text tags includes special formatting indicia, leaving the preformatted text tags in the text.

8. An apparatus for automatically converting preformatted text to reflowable text, comprising:

first determination means for determining whether text includes preformatted text tags defining line formatting for text delimited by the preformatted text tags;

second determination means, responsive to determining that the text includes preformatted text tags defining line formatting for text delimited by the preformatted text tags, for determining whether text delimited by the preformatted text tags includes special formatting indicia indicating that the text delimited by the preformatted text tags should not be converted to reflowable text; and text editing means, responsive to determining that the text delimited by the preformatted text tags does not include special formatting indicia, for deleting the preformatted text tags, wherein the text is automatically converted from preformatted text to reflowable text.

9. The apparatus of claim 8, wherein the second determination means further comprises:

means for determining whether the text delimited by the preformatted text tags includes character sequences selected from the group consisting of multiple successive tabs, multiple successive spaces, and special characters.

10. The apparatus of claim 8, wherein the second determination means further comprises:

means for determining whether the text delimited by the preformatted text tags includes multiple successive spaces occurring at a location other than a location selected from the group consisting of the beginning of a line, the end of a line, and following a colon.

11. The apparatus of claim 8, wherein the editing means further comprises:

means, responsive to determining that the text delimited by the preformatted text tags includes special formatting indicia, for leaving the preformatted text tags in the text.

12. A computer program product for use with a data processing system, comprising:

a computer usable medium;

first instructions on the computer usable medium for determining whether a document includes at least one specially formatted element;

second instructions on the computer usable medium, responsive to a determination that the document includes at least one specially formatted element, for determining whether the at least one specially formatted element includes text and indicia that the text should not be reflowed; and third instructions on the computer usable medium, responsive to determination that the at least one specially formatted element does not include indicia that the text should not be reflowed, for reflowing the text, wherein the preformatted text within the document is automatically converted to reflowable text.

13. The computer program product of claim 12, wherein the first instructions further comprise:

instructions for determining whether the document includes preformatted text.

14. The computer program product of claim 13, wherein the first instructions further comprise:

instructions for determining whether the document includes preformatted text tags delimiting the preformatted text.

15. The computer program product of claim 14, wherein the second instructions further comprise:

instructions for determining whether the preformatted text delimited by the preformatted text tags includes character sequences selected from the group consisting of multiple successive tabs, multiple successive spaces, and special characters.

16. The computer program product of claim 15, wherein the third instructions further comprise:

instructions, responsive to determining that the preformatted text delimited by the preformatted text tags includes indicia that the text within the at least one specially formatted element should not be reflowed, for leaving the preformatted text tags in the text.

* * * * *